United States Patent [19]

Obermeier

[11] Patent Number: 5,487,434
[45] Date of Patent: Jan. 30, 1996

[54] ROCK DRILL WITH CONVEYING GROOVE

[75] Inventor: Josef Obermeier, Peiting, Germany

[73] Assignee: Hilti Aktiengesellschaft, Schaan, Liechtenstein

[21] Appl. No.: 338,066

[22] Filed: Nov. 14, 1994

[30] Foreign Application Priority Data

Nov. 12, 1993 [DE] Germany ............ 43 38 667.9

[51] Int. Cl.$^6$ ............... F21B 10/44
[52] U.S. Cl. ............... 175/323; 175/394
[58] Field of Search ............... 175/323, 394, 175/415, 400; 408/67, 230

[56] References Cited

U.S. PATENT DOCUMENTS

| | | | |
|---|---|---|---|
| 3,085,639 | 4/1963 | Fitch | 175/323 |
| 3,372,763 | 6/1966 | Fischer | 175/394 |
| 3,469,643 | 9/1969 | Horst | 175/394 |
| 4,210,215 | 7/1980 | Peetz et al | 175/323 X |
| 4,503,920 | 3/1985 | Clement | 175/415 X |
| 4,883,135 | 11/1989 | Moser et al | 408/230 X |
| 4,942,931 | 7/1990 | Moser et al | 175/323 |
| 4,951,761 | 8/1990 | Peetz et al | 175/394 X |
| 4,967,855 | 11/1990 | Moser | 175/394 |
| 5,403,130 | 4/1995 | Moser et al | 175/323 X |

*Primary Examiner*—Frank S. Tsay
*Attorney, Agent, or Firm*—Anderson Kill Olick & Oshinsky

[57] ABSTRACT

An axially elongated rock drill has a chucking shank section (1) at one end and a drilling tip (2) at the opposite end, helically arranged first grooves (3, 4) are located in the outside surface of the drill and extend from adjacent the drilling tip towards the chucking shank section. Helically arranged lands (R) are located between the first grooves and form the outside surface of the drill. The lands have helically arranged auxiliary second grooves located between helically arranged guidance regions (7, 8, 9, 10). Accordingly, the second grooves are spaced from the first grooves by the guidance regions. The width (BH) of the first grooves (3, 4) is approximately twice the total width (BG) of the lands, that is, the width of the two guidance regions and one second groove.

6 Claims, 1 Drawing Sheet

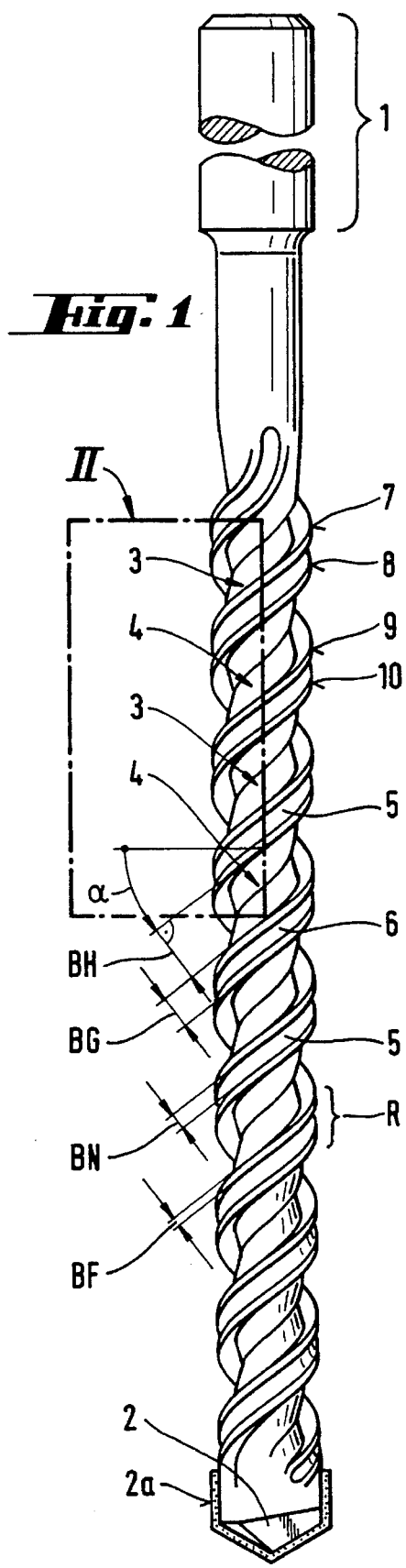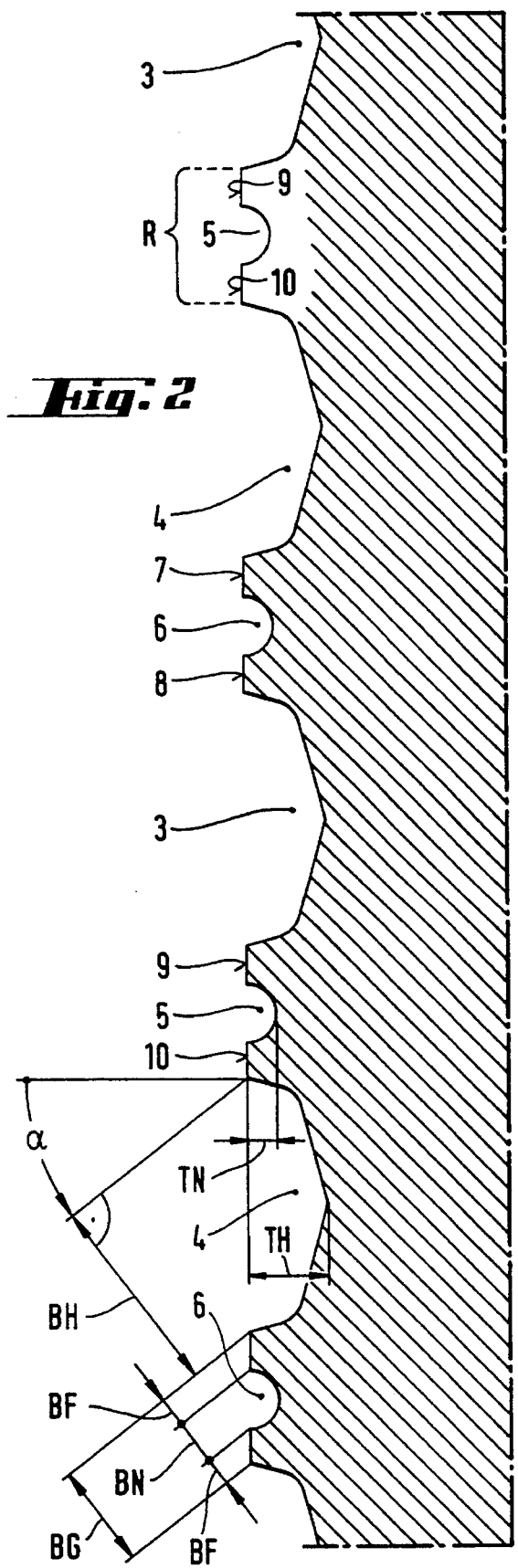

ROCK DRILL WITH CONVEYING GROOVE

BACKGROUND OF THE INVENTION

The present invention is directed to a rock drill with an axially elongated shank having a chucking shank section at one end, and a drilling tip at the opposite end with helically arranged conveying grooves extending from adjacent the drilling tip towards the chucking shank section. Helically arranged lands, located between the conveying grooves, have auxiliary grooves located between guidance regions adjacent the conveying grooves.

Rock drills of the above type are used for drilling boreholes in rock, concrete, masonry and the like. Generally, the rock drills are given a rotary motion along with a percussion motion provided by a driving device. Both motions serve for producing a drilling advance. Friction developed between conventional rock drills and the rock or other material has a negative effect upon the feed or advance of the drill, since the friction consumes a large portion of the power output delivered by the driving device.

To overcome to some degree the above-mentioned friction, known rock drills generally comprise two helically arranged conveying groves with lands located between the grooves. Since such lands must have a certain width for reasons of strength, a relatively large contact surface is formed with the rock and results in a correspondingly high friction. Additionally, this friction is increased by the drilled material or drillings which penetrate between the lands and the rock in spite of the conveying groove and due to a dragging action result in an increased friction and may even lead to jamming of the rock drill.

To overcome these disadvantages, a rock drill is known from U.S. Pat. No. 2,370,706 which has two conveying grooves with an auxiliary groove formed in the land between the conveying grooves. This auxiliary groove, intended to reduce the surface of the land causing friction, has a flat and a circular segment shape. Due to the flat and circular segment shape, it is necessary to provide a large width for the land, to afford a sufficient reduction of the surface resulting in friction. The large width of the land results in the disadvantage that the width of the conveying grooves must be selected relatively small in comparison to the width of the land. The relatively small width of the conveying groove provides only a small space for conveying the drillings, whereby an output loss occurs in this known drill due to the insufficient ability to convey the drillings.

The removal of the drillings in this known rock drill is insufficient, particularly if wet rock, concrete, masonry or the like is to be drilled, or if a cooling medium is supplied to the rock drill during the drilling operation. If the drillings penetrate into the auxiliary grooves shaped to be relatively flat toward the outside surface of the drill they can cause jamming, so that the drilling operation is impaired by an additional reduction in output. Additionally, the small width of the conveying grooves causes an unsatisfactory removal of the drillings and results in frequent interruptions of the drilling operation and, as a result, with more time being consumed.

SUMMARY OF THE INVENTION

Therefore, the primary object of the present invention is to provide a rock drill distinguished by a high output capacity due to effective removal of the drillings and low friction losses.

In accordance with the present invention, the width of the conveying groove, measured at right angles to the inclination of the groove relative to the axis of the rock drill, is in the range of 1.4 to 2.5 times the width of the land made up of the auxiliary groove and two guidance regions bracketing the auxiliary grooves also measured perpendicularly to the inclination of the auxiliary grooves, which corresponds to the inclination of the conveying grooves.

Accordingly, due to the greater width of the conveying grooves it is possible to remove a larger quantity of the drillings and, at the same time, reduce the surfaces of the land in contact with the borehole wall, whereby an overall increase in the drilling output is attained.

The width of the auxiliary grooves measured perpendicularly to their inclination to the central axis preferably corresponds to 0.5 to 2.5 times the width of the guidance region measured perpendicularly to the inclination. Depending on the properties of the rock, concrete, masonry or the like to be worked, the width of the guidance regions can be increased and the width of the auxiliary groove decreased. For instance, where hard material is being drilled, the width of the guidance regions can be smaller while the auxiliary groove can be made wider.

Basically, the auxiliary grooves cause a reduction in the surfaces of the lands. In addition, they can also serve for removing the drillings caught between the lands and the borehole wall. In this manner, jamming of the rock drill is counteracted, so that the output of the rock drill can be further increased. Preferably, the radially measured depth of the auxiliary grooves is in the range of 0.2 to 0.5 times the depth of the conveying grooves.

To prevent jamming of the drillings in the region of the auxiliary groove, in particular when removing drillings in wet rock, concrete, masonry and the like, the cross-section of the auxiliary grooves extending at right angles to the inclination of such grooves is preferably semi-circularly shaped. To assure a thorough removal of the drillings by means of the conveying grooves, the cross-section of the conveying grooves extending at right angles to the inclination of such grooves is preferably shaped to be symmetrical with regard to a center line of the groove with the depth of the groove at a maximum along the center line and sloping outwardly in a flat manner towards the adjacent guidance region and then extending steeply to intersect with the guidance region. This suitable cross-sectional shape of the conveying grooves enables the handling of larger quantities of drillings and a very effective conveyance of such drillings.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 1 is an elevational view of a rock drill embodying the present invention; and FIG. 2 is an enlarged sectional view of a section of the rock drill designated by II in FIG. 1.

DETAILED DESCRIPTION OF THE INVENTION

In FIG. 1 an axially elongated rock drill is shown with a shank having a chucking shank section 1 at one end and a drilling tip 2 equipped with a hard metal cutting plate 2a at the other end. The shank of the rock drill has helically arranged conveying first grooves 3, 4 extending along the shank from adjacent the drilling tip 2 towards the chucking shank section 1. Lands R are located between the first grooves 3, 4 and are helically arranged and include helically shaped auxiliary second grooves 5, 6. The conveying first grooves 3, 4 and the auxiliary second grooves 5, 6 are spaced from one another by guidance regions 7, 8, 9, 10 formed in the lands R.

The first grooves 3, 4 and the second grooves 5, 6 extend at the same angle of inclination relative to the axis of the rock drill shank. As shown in FIGS. 1 and 2 the angle of inclination $\alpha$ is measured from a line extending at right angles to the axis, however, the angle can also be measured from the rock drill shank axis. The width BH of the first grooves 3, 4 measured at right angles to the inclination angle $\alpha$ are in the range of 1.4 to 2.5 times the width BG of the land R made up of the auxiliary or second grooves 5, 6 and the two guidance regions 7, 8, 9, 10 bracketing the second grooves also measured perpendicularly to the inclination angle $\alpha$. The width BN of the second grooves 5, 6 measured perpendicularly to the inclination angle is in the range of 0.5 to 2.5 times the width BF of a guidance region 7, 8 also measured perpendicularly to the inclination angle. The depths TN of the second grooves 5, 6 is in the range of 0.2 to 0.5 times the depth TH of the conveying first groove 3, 4, note FIG. 2.

As shown in FIG. 2, the cross-section of the second groove 5, 6 extending perpendicularly to the inclination angle $\alpha$ is semi-circularly shaped.

The cross-section of the conveying or first grooves 3, 4 measured perpendicularly to the inclination angle is symmetrical about the center line of the first groove first extending outwardly in a flat manner from the center line and sloping towards the outside surface of the rock drill shank and then at the outer end of the flat section extending steeply towards the adjacent guidance region 7, 8, 9, 10.

As shown in FIG. 1, the hard metal cutting plate 2a located at the drilling tip 2 projects radially outwardly beyond the outside surface of the guidance regions 7, 8, 9, 10 of the lands R forming the outside surface of the rock drill.

While a specific embodiment of the invention has been shown and described in detail to illustrate the inventive principles, it will be understood that the invention may be embodied otherwise without departing from said principles.

I claim:

1. A rock drill has an axially elongated shank with an axially extending outside surface and a central axis, said shank has an axially extending chucking shank section (1) at one end thereof and a drilling tip (2) at an opposite end thereof, helically shaped conveying first grooves are formed in said outside surface and extend from adjacent said drilling tip towards said chucking shank section (1), helically shaped lands (R) are located between said conveying first grooves and extend from adjacent said drilling tip towards said chucking shank section, said lands (R) form said outside surface and have a helically-shaped auxiliary second groove (5, 6) positioned between a pair of helically-shaped guidance regions (7, 8, 9, 10) adjoining said first grooves, said first grooves and said lands having an angle of inclination relative to the central axis, wherein the improvement comprises that said conveying first grooves have a width (BH) measured perpendicularly to the angle of inclination, said lands comprising said guidance regions (7, 8, 9, 10) and said second grooves (5, 6) have a width (BG) measured perpendicularly to the angle of inclination, and the width (BH) of said first grooves is in a ratio in the range of 1.4 to 2.5 times to the width (BG) of said lands.

2. Rock drill, as set forth in claim 1, wherein said second grooves (5, 6) have a width (BN) measured perpendicularly to the inclination angle in the range of 0.5 to 2.5 times a width (BF) of said guidance regions (7, 8, 9, 10) measured perpendicularly to the angle of inclination.

3. Rock drill, as set forth in claim 1 or 2, wherein said second grooves (5, 6) have a depth (TN) in the range of 0.2 to 0.5 times a maximum depth (TH) of said first grooves (3, 4).

4. Rock drill, as set forth in claim 1 or 2, wherein said second grooves (5, 6) extending perpendicularly to the inclination angle are substantially semi-circularly shaped.

5. Rock drill, as set forth in claim 1 or 2, wherein said first grooves (3, 4) extending perpendicularly to the inclination angle are arranged symmetrically about a helically extending center line of said first groove with said first grooves having a maximum depth at the center line and sloping outwardly in a flat manner from the center line towards the adjacent guidance regions (7, 8, 9, 10) and then extending steeply from outer ends of said flat surfaces into intersection with said guidance regions (7, 8, 9, 10).

6. Rock drill, as set forth in claim 2, wherein said second grooves (5, 6) have a depth (TN) in the range of 0.2 to 0.5 times a maximum depth (TH) of said first grooves (3, 4), said second grooves (5, 6) extending perpendicularly to the inclination angle are substantially semi-circularly shaped, and said first grooves extending perpendicularly to the inclination angle are shaped symmetrically about a helically-extending center line of said first grooves with said first grooves having a maximum depth along the center line and sloping outwardly in a flat surface towards said adjacent guidance regions (7, 8, 9, 10) and then extending steeply from the outer edges of said flat surfaces into intersection with said guidance regions.

\* \* \* \* \*